United States Patent
Abraham

(10) Patent No.: US 6,684,334 B1
(45) Date of Patent: Jan. 27, 2004

(54) SECURE ESTABLISHMENT OF CRYPTOGRAPHIC KEYS USING PERSISTENT KEY COMPONENT

(75) Inventor: Dennis G. Abraham, Concord, NC (US)

(73) Assignee: Trusted Security Solutions, Inc., Matthews, NC (US)

(*) Notice: Subject to any disclaimer, the term of this patent is extended or adjusted under 35 U.S.C. 154(b) by 0 days.

(21) Appl. No.: 09/321,190

(22) Filed: May 27, 1999

Related U.S. Application Data

(60) Provisional application No. 60/086,887, filed on May 27, 1998.

(51) Int. Cl.[7] .............................. H04L 9/32; G06F 15/30
(52) U.S. Cl. ........................ 713/194; 713/201; 380/277; 380/278; 380/279; 380/280; 235/379
(58) Field of Search ................................ 380/277–280; 235/379; 713/194, 201

(56) References Cited

U.S. PATENT DOCUMENTS

| | | | | |
|---|---|---|---|---|
| 4,025,760 A | * | 5/1977 | Trenkamp | 235/61.7 |
| 4,288,659 A | * | 9/1981 | Atalla | 178/22.08 |
| 4,536,647 A | * | 8/1985 | Atalla et al. | 235/379 |
| 4,771,461 A | * | 9/1988 | Matyas | 380/24 |
| 4,819,267 A | | 4/1989 | Cargile et al. | |
| 4,912,762 A | * | 3/1990 | Lee et al. | 380/24 |
| 5,060,263 A | | 10/1991 | Bosen et al. | |
| 5,115,467 A | * | 5/1992 | Esserman | 380/44 |
| 5,787,173 A | * | 7/1998 | Seheidt et al. | 380/21 |
| 6,052,468 A | * | 4/2000 | Hillhouse | 713/194 |

FOREIGN PATENT DOCUMENTS

| | | | | |
|---|---|---|---|---|
| EP | 0 254 812 | | 2/1988 | |
| EP | 0 334 503 A2 | * | 9/1989 | H04L/9/00 |
| EP | 0531 784 A2 | * | 3/1993 | G06F/12/14 |
| GB | 5 274 229 | | 7/1994 | |

\* cited by examiner

*Primary Examiner*—Ayaz Sheikh
*Assistant Examiner*—Taghi T. Arani
(74) *Attorney, Agent, or Firm*—Marcia L. Doubet; Christopher C. Dremann

(57) ABSTRACT

An apparatus and method is disclosed for securely establishing a unique cryptographic key in a first cryptographic device, for example an Automated Teller Machine (ATM). In a preferred embodiment, the ATM includes means for entering a key component and an ATM processor board, and the apparatus includes a microprocessor and a persistent, non-volatile memory device electrically disposed between the key component entry means and the ATM processor board. In a preferred embodiment of the method, the microprocessor detects and captures a key component entered by a key custodian. The microprocessor then determines whether a first key component is present in the non-volatile memory device. If not, the key component is stored in the non-volatile memory device as the persistent key component (PKC). If a PKC is present in the non-volatile memory device, the key component is temporarily stored as a second key component. Each byte of the second key component is then combined with the corresponding byte of the PKC to form the unique cryptographic key. The same unique cryptographic key is securely established in a second cryptographic device to facilitate secure electronic communications. Preferably, the PKC is entered by a first key custodian at a convenient location and time and the second key component is entered by a second key custodian at a subsequent time in the field. Thus, a unique cryptographic key is securely established in the ATM in compliance with network operating rules and voluntary ANSI Standards while utilizing only a single key custodian in the field.

18 Claims, 1 Drawing Sheet

SECURE ESTABLISHMENT OF CRYPTOGRAPHIC KEYS USING PERSISTENT KEY COMPONENT

CROSS REFERENCE TO RELATED APPLICATION

This application claims the benefit of Provisional Application Serial No. 60/086,887, filed May 27, 1998, the disclosure of which is incorporated herein by reference.

BACKGROUND OF THE INVENTION

1. Field of the Invention

The invention relates to an apparatus and method for securely establishing a unique cryptographic key in a first cryptographic device. More particularly, the invention relates to an apparatus and method for compliantly establishing unique cryptographic keys in a plurality of cryptographic devices that are geographically widely scattered, such as bank Automated Teller Machines (ATMs), while utilizing only a single key custodian in the field.

2. Description of Related Art

A bank or other financial institution may provide Automated Teller Machines (ATMs), or equivalent field devices, for the convenience of its customers. The ATMs usually communicate electronically with a central computer physically located at the bank so that the customer can manipulate his bank account at any time regardless of the operating hours of the bank without interacting with a human representative. Such bank transactions may include the transfer of money between accounts, the deposit and withdrawal of funds, and the like. Network operating rules and voluntary ANSI Standards require the use of cryptography to protect sensitive information, such as the Personal Identification Number (PIN) usually associated with such bank transactions, from potential compromise by an opponent intent on committing fraud against the network and the cardholder.

As should be expected, it is necessary for the bank to verify that a field device, for example an ATM, is authorized to communicate with the central computer at the branch office. Such measures endeavor to prevent an unauthorized device from imitating the ATM and accessing a customer's account without proper authorization. There are a number of ways in which to establish secure electronic communications between a network of ATMs and the central computer. One way is via a dedicated arrangement of data transmission lines. The transmission lines connect the ATMs directly to the central computer. Accordingly, only authorized ATMs can communicate with the central computer over the dedicated transmission lines. However, the cost of installing dedicated transmission lines and the associated communications hardware is generally prohibitive, especially in light of the need to secure rights of way to carry the transmission lines between each of the ATMs and the central computer. Furthermore, even dedicated transmission lines may still be vulnerable to access by individuals possessing the ability to physically tap into the transmission lines.

A more economical approach to establish secure electronic communications between a network of field devices and a host device is by means of cryptography. Good cryptographic practice requires that each pair of communicating devices on the network share a unique cryptographic key. The use of a unique cryptographic key for each pair of communicating devices limits the degree to which an unauthorized user can compromise the network to that single pair of devices. Where a plurality of devices are provided with a common cryptographic key, often referred to as a Global key, an unauthorized user can compromise all of the devices by compromising any one of the devices sharing the Global key. For example, an unauthorized user could gain access to a large number of ATMs with the knowledge of only a single cryptographic key. The banking industry actually facilitates this high degree of risk since the present practice is to load many field devices in a network with a Global key for operational convenience.

Two general types of cryptography are presently in use. One type is public key or asymmetric cryptography, for example RSA. The other type is symmetric cryptography, for example the Data Encryption Algorithm (DEA). The DEA is currently the most widely used algorithm in ATM banking devices. Symmetric cryptography requires the same cryptographic key to be established at both cryptographic devices, namely the field device and the host device. In addition, symmetric cryptography requires the cryptographic key to be managed under the principles of split knowledge and dual control usually implemented by utilizing two different individuals, referred to as key custodians, to establish the key. Each key custodian is entrusted with a portion, referred to as a component, of the cryptographic key that they must physically enter into the field device, for example an ATM. Thus, each of the key custodians must personally visit each ATM in the network in turn to establish the appropriate cryptographic key in the ATM. The same, or other key custodians, must then personally visit the host device to establish the same cryptographic key in the host device. Since the ATMs and the host devices are oftentimes geographically widely scattered, it is frequently impractical for the key custodians to accomplish the necessary visits within an acceptable timeframe. As a result of this key management logistics problem, many banks use the same cryptographic key for a large number of ATMs on a single ATM network.

With the above concerns in mind, it is an objective of the present invention to provide an apparatus and method for securely establishing a unique cryptographic key in a first cryptographic device.

It is a further objective of the present invention to provide an apparatus and method for compliantly establishing a unique cryptographic key between a first cryptographic device and a second cryptographic device that are geographically widely scattered.

It is a further, and more particular, objective of the present invention to provide an apparatus and method for compliantly establishing a unique cryptographic key in a first cryptographic device without the custodial overhead normally associated with the distribution and secure management of the individual key components.

It is a further, and still more particular, objective of the present invention to provide an apparatus and method for compliantly establishing unique cryptographic keys in a plurality of cryptographic devices while utilizing only a single key custodian.

These and other objectives and advantages will become more readily apparent to those of skill in the art with reference to the following detailed description and the accompanying drawing figures.

SUMMARY OF THE INVENTION

The aforementioned ojectives and advantages are realized by an apparatus and method for securely establishing a unique cryptographic key in a first cryptographic device, for example an ATM of the type commonly provided by a bank or other financial institution. The same unique cryptographic key can then be securely established in a second cryptographic device, such as a central computer at the bank, in any known manner. Preferably, however, the unique cryptographic key is securely established in the second cryptographic device in the manner disclosed in co-pending U.S. patent application Ser. No. 09/273,416 (now U.S. Pat. No. 6,606,387), the disclosure of which is expressly incorporated herein. The unique cryptographic key ensures secure electronic communications between the ATM and the central computer. Most importantly, the apparatus and method of the present invention permit the unique cryptographic key to be compliantly established in the ATM utilizing only a single key custodian in the field.

Preferably, the ATM includes means for entering a key component and an ATM processor board. In a preferred embodiment, the apparatus includes a microprocessor and persistent key component storage means electrically disposed between the key component entry means of the ATM and the ATM processor board. The microprocessor may be any electronic circuit suitable for implementing the persistent key component logic, for example a Motorola 6805 class microprocessor. The persistent key component storage means may be any non-volatile memory device, for example a conventional battery-backed, tamper resistant Random Access Memory (RAM) or an Electrically Erasable Programmable Read Only Memory (EEPROM). The microprocessor includes means for detecting and capturing a key component entered into the ATM, discriminating means for determining whether a persistent key component is present in the persistent key component storage means and means for combining a second key component with the persistent key component to form the unique cryptographic key.

In a preferred embodiment of the method, the microprocessor monitors the key component entry means of the ATM to detect and capture a key component entered by a key custodian. The discriminating means then determines whether a first, or persistent, key component is present in the non-volatile memory device. If not, the key component is stored in the non-volatile memory device as the persistent key component. If a persistent key component is already present in the non-volatile memory device, the key component is stored in a temporary, non-persistent memory device as the second key component. Each byte of the second key component is then combined with the corresponding byte of the persistent, key component to form the unique cryptographic key. The unique cryptographic key is then passed to the ATM processor board so that the ATM may conduct secure electronic communications with the central computer at the bank. The persistent key component is entered into the ATM by a first key custodian at a convenient location and time and the second key component is entered by a second key custodian at a subsequent time in the field. Thus, the unique cryptographic key is established in compliance with network operating rules and voluntary ANSI Standards while utilizing only a single key custodian in the field.

DETAILED DESCRIPTION OF THE PREFERRED EMBODIMENTS

Figure 1:
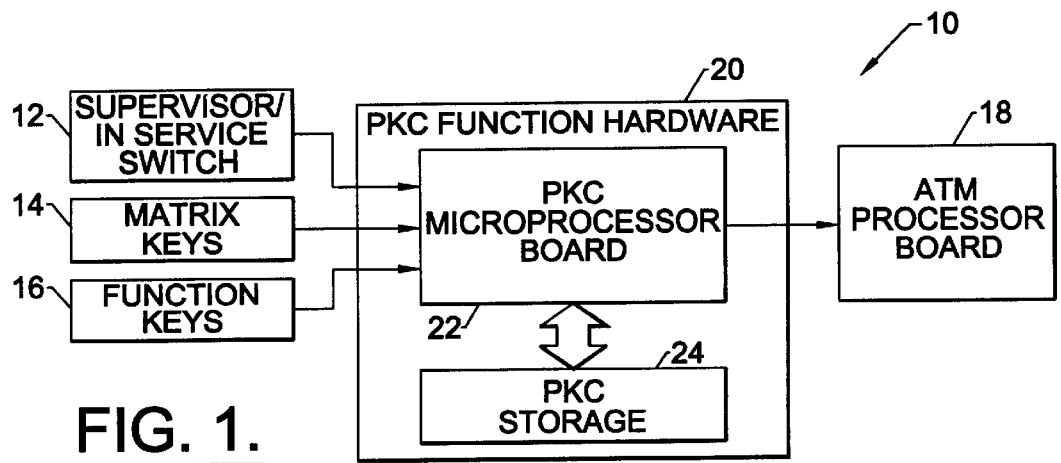
FIG. 1 is a schematic diagram of a preferred embodiment of an apparatus according to the present invention for establishing a secure cryptographic key using a persistent key component.

Referring now to the accompanying drawings, FIG. 1 is a schematic diagram of a preferred embodiment of an apparatus, indicated generally at 10, according to the present invention. The apparatus 10 comprises Persistent Key Component ("PKC") function hardware 20 for securely establishing a unique cryptographic key in a first cryptographic device. The first cryptographic device may be any device for transmitting and receiving secure electronic communications. Preferably, however, the first cryptographic device is a conventional Automated Teller Machine (ATM) of the type commonly provided by a bank or other financial institution for the convenience of its customers. The ATM communicates electronically with a central computer physically located at the bank so that a customer can manipulate his account at any time regardless of the operating hours of the bank without interacting with a human representative. As previously described, it is desirable to establish a unique cryptographic key between the ATM and a second cryptographic device, for example the central computer at the bank or an intermediary host cryptographic security module, to protect sensitive information associated with bank transactions from potential compromise by an opponent intent on committing fraud.

The PKC function hardware 20 permits a unique cryptographic key to be securely established in the first cryptographic device in a manner that complies with accepted network operating rules and voluntary ANSI Standards, such as ANSI X9.24—Retail Key Management. In particular, the PKC function hardware 20 permits a unique cryptographic key to be compliantly established in a first cryptographic device without the custodial overhead normally associated with the distribution and secure management of the individual key components. The same unique cryptographic key can then be established in a second cryptographic device that is remotely located from the fist cryptographic device in any known, secure manner. Preferably, however, the unique cryptographic key is securely established between the first cryptographic device and the second cryptographic device in the manner disclosed in co-pending U.S. patent application Ser. No. 09/273,416 (now U.S. Pat. No. 6,606,387), the disclosure of which is expressly incorporated herein. As will be described more fully hereafter, symmetric cryptography is thereby accomplished while utilizing only a single key custodian in the field.

The PKC function hardware 20 is preferably provided in the form of a conventional electronic circuit board that is inserted in the electric cabling of the ATM between the output from the existing command entry panel, identified collectively by reference numerals 12, 14 and 16 in FIG. 1, and the ATM processor board 18. The command entry panel may be any means for electronically inputting a key component to the PKC function hardware 20.

Preferably, however, the command entry panel of the ATM is a hard-wired input interface that relates a predetermined function to a preselected input, such as a keystroke command or a function command. Examples of such ATMs include the various models manufactured by Fujitsu, IBM and NCR, and in particular the NCR 5xxx series of ATMs. In the preferred embodiment of the apparatus described herein, the command entry panel of the ATM comprises a conventional key matrix 14, for example a 3×4 or a 4×4 matrix of pre-programmed keys, and a plurality of programmable function keys 16. Preferably, the matrix keys 14 comprise numeric keys 0–9, and two symbol keys, for example "*" and "#". The function keys 16 consist of a plurality of response keys positioned adjacent selections presented on a computer screen. The matrix keys 14 and function keys 16 may be mechanical keys or electrical keys activated by pressure, such as a conventional touch screen, by an optical sensor or by any other known means. Regardless, the matrix keys 14 and function keys 16 open and close electrical circuits to pass keystroke commands and function key commands to the PKC function hardware 20 and the ATM processor board 18 in a known manner.

The ATM further comprises a conventional switch 12, for example a toggle or rocker switch, for alternately switching the command entry mode between a "Supervisor" and an "In Service" mode. The Supervisor/In Service switch 12 may be activated in the field by a service technician to repair the ATM or by a key custodian to enter a key component. The Supervisor/In Service switch 12 is moved to the "Supervisor" position to temporarily interrupt banking transactions between the ATM and the bank. In "Supervisor" mode, the function keys 16 activate commands relating to the repair of the ATM or to the entry of a key component into the ATM. As previously mentioned, the function keys 16 relate predetermined functions to a preselected input. For example, one of the function keys 16 may be positioned adjacent a menu selection on a computer screen that reads: ENTER A KEY COMPONENT. If selected, the function key transmits a command to the PKC function hardware 20 to accept a key component. Typically, the computer screen then instructs the key custodian to enter the key component using the matrix keys 14.

The PKC function hardware 20 comprises means for detecting and capturing the entry of a key component. The detecting and capturing means may be any known electronic circuit for detecting and capturing the entry of a key component. Such circuitry is well known to those skilled in the art of electronic circuit design and therefore will not be described in detail herein. Preferably, however, the detecting and capturing means is implemented on a PKC microprocessor board 22 electrically coupled to the circuit board of the PKC function hardware 20. The PKC microprocessor board 22 may be any conventional microprocessor, for example, the 6805 class microprocessor manufactured by Motorola. The detecting and capturing means electronically monitors the electrical signals transmitted between the command entry panel and the ATM processor board 18. When the command entry panel transmits a command to the PKC function hardware 20 to accept a key component in response to the corresponding function key 16, the detecting and capturing means detects the command and readies the PKC microprocessor board 22 to capture the key component. The detecting and capturing means then captures the key component entered by the key custodian from the numeric matrix keys 14 and temporarily retains the key component for persistent storage or further processing, as will be described hereinafter.

The PKC function hardware 20 further comprises means for discriminating between the entry of a first key component and the entry of a second key component detected and captured as previously described. The discriminating means may be any known electronic circuit for discriminating between the entry of a first key component and the entry of a second key component. Such circuitry is well known to those skilled in the art of electronic circuit design and therefore will not be described in detail herein. Preferably, however, the discriminating means is likewise implemented on the PKC microprocessor board 22. Once a key component has been detected and captured, the discriminating means determines whether the key component is the first key component or the second key component of the unique cryptographic key. Preferably, the discriminating means is initially assigned a "0" value. The discriminating means is subsequently assigned a "1" value the first time that a key component is entered into the first cryptographic device and captured by the detecting and capturing means of the PKC function hardware 20. Thus, the discriminating means can always determine whether the key component is a first key component or a subsequently entered second key component. If the key component is a first key component, the discriminating means transmits an electrical signal to a persistent memory device for storing the first key component, as will be described hereinafter.

The PKC function hardware 20 further comprises means for persistently storing a first key component detected, captured and discriminated as previously described. The persistent storing means may be any known electronic circuit for the "non-volatile" storage of data. As used herein, the term "non-volatile" means that once a first key component is entered into the PKC function hardware 20 from the matrix keys 14 of the ATM, the first key component can only be erased or replaced under program control of the PKC function hardware. Such circuitry is well known to those skilled in the art of electronic circuit design and includes, for example, a conventional battery-backed, tamper resistant Random Access Memory (RAM) or an Electrically Erasable Programmable Read Only Memory (EEPROM). Thus, for purposes of the present invention, the first key component is termed a "Persistent Key Component" or "PKC." The persistent storing means may be integral with the PKC microprocessor board 22. However, a separate electronic circuit in electrical communication with the PKC microprocessor board 22 is also acceptable, as illustrated by the preferred embodiment described herein and shown as PKC Storage 24 in FIG. 1.

The PKC function hardware 20 further comprises means for combining the first key component (i.e., the Persistent Key Component) with a second key component that has been detected, captured and discriminated as previously described. The combining means may be any known electronic circuit for combining a first key component with a subsequently entered second key component to form a unique cryptographic key. Such circuitry is well known to those skilled in the art of electronic circuit design. Preferably, however, the combining means comprises a conventional "exclusive or" operation and is likewise implemented on the PKC microprocessor board 22. Once the second key component is detected, captured and discriminated, the PKC is recalled from the PKC storage 24 and each byte of the second key component is combined with the corresponding byte of the PKC using the "exclusive or" operation to form the unique cryptographic key.

Finally, the PKC function hardware 20 flyer comprises means for inputting the unique cryptographic key to the ATM processor board 18. The inputting means may be any known electronic circuit for inputting the unique cryptographic key to the ATM processor board 18. Such circuitry is well known to those skilled in the art of electronic circuit design and therefore will not be described in detail herein. Preferably, however, the inputting means is likewise implemented on the PKC microprocessor board 22. Once the first and second key components have been detected, captured, discriminated, stored (in the case of the first key component) and combined as previously described, the inputting means inputs the unique cryptographic key to the ATM processor board 18 to establish secure communications with a second cryptographic device. Preferably, the same unique cryptographic key is established in the second cryptographic device in the manner disclosed in co-pending U.S. patent application Ser. No. 09/273,416 (now, U.S. Pat. No. 6,606, 387). As a result, a unique cryptographic key is established between the first cryptographic device and the second cryptographic device to enable secure electronic communications therebetween.

Figure 2:
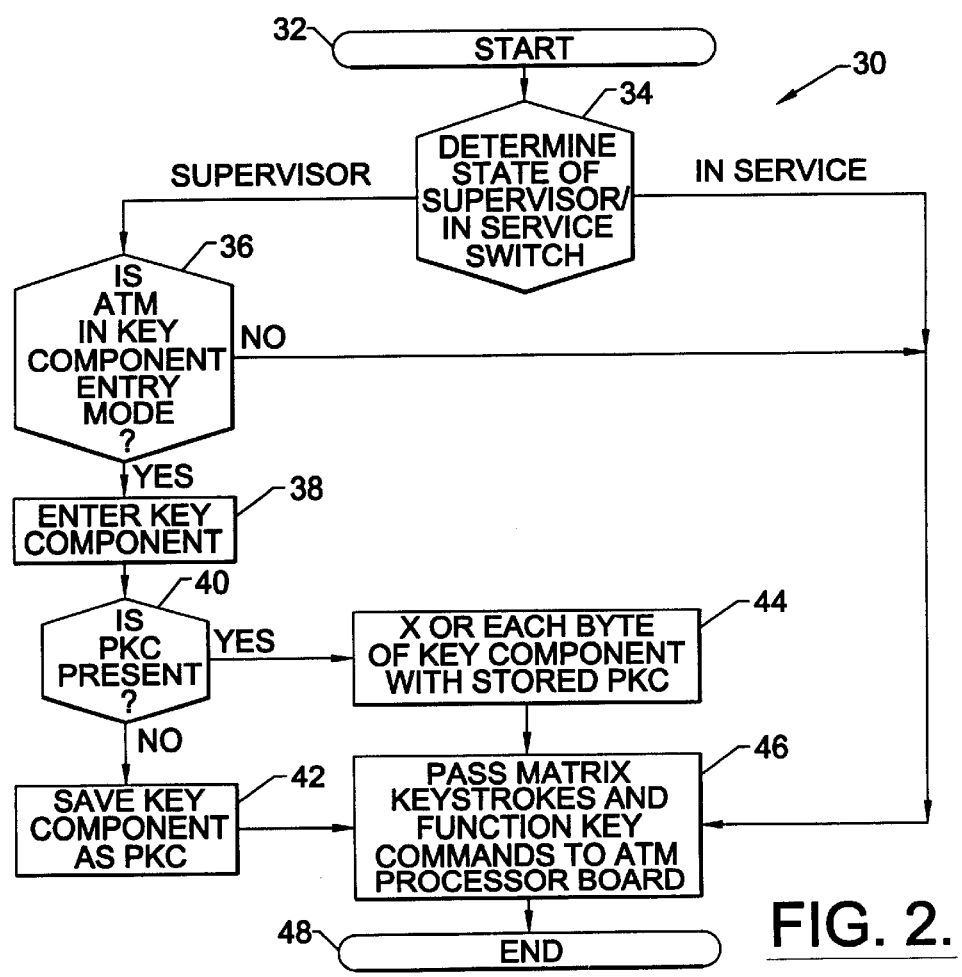
FIG. 2 is a flowchart of a preferred method according to the present invention for establishing a secure cryptographic key using a persistent key component.

FIG. 2 is a flow chart of a preferred embodiment of a method, indicated generally at 30, according to the present invention. The method 30 comprises steps 32 through 48 for securely establishing a unique cryptographic key in a first cryptographic device. The same unique cryptographic key is securely established in a second cryptographic device by any known method, but is preferably established by the method described in co-pending U.S. patent application Ser. No. 09/273,416. Although symmetric cryptography is thereby accomplished, compliance with network operating rules and voluntary ANSI Standards is accomplished only if the first key component and the second key component are entered into the ATM by different individuals using the principles of dual control and split knowledge. The first key component is preferably entered at a convenient time and location, such as during initialization at the ATM staging facility or during ATM installation at the field location of the ATM. The second key component is entered by a key custodian in the field, preferably an installation and service representative for the ATM, at a subsequent time in the field. Accordingly, the requirement of dual control and split knowledge for compliance with network operating rules and voluntary ANSI Standards is accomplished without the need for two key custodians being simultaneously present in the field, as is currently required.

In the preferred embodiment of the method 30 described and illustrated herein, a first key custodian obtains a first key component to be entered into the ATM. The first key component may be obtained in any manner, but preferably is obtained from a tamper evident envelope as described in co-pending application Ser. No. 09/273,416. As shown, the method 30 comprises the step 34 of determining the operational state of the Supervisor/In Service switch 12 of the ATM. If the switch 12 is in the "in Service" position, the method 30 comprises the further step 46 wherein the keystroke commands from the matrix keys 14 and the function commands from the function keys 16 pass through the PKC function hardware 20 directly to the ATM processor board 18. If the switch 12 is in the "Supervisor" position, the detecting and capturing means of the PKC function hardware 20 detects and captures keystroke commands from the matrix keys 14 and function commands from the function keys 16 so that a key component can be entered into the ATM, as will be described hereinafter.

The method 30 comprises the further step 36 of determining whether the ATM is in key component entry mode. The detecting and capturing means of the PKC function hardware 20 monitors the keystroke commands from the matrix keys 14 and the function commands from the function keys 16. As previously mentioned, the function keys 16 relate predetermined functions to a preselected input. For example, one of the function keys 16 may be positioned adjacent a menu selection on a computer screen that reads: ENTER A KEY COMPONENT. If selected, the function key 16 transmits a command to the PKC function hardware 20 to accept a key component. Alternatively, the ATM may activate the "enter key component" mode utilizing the matrix keys 14 by displaying an ENTER KEY COMPONENT message on the display prompting the user to press a particular numeric or symbol key. If selected, the ATM is placed in key component entry mode and the detecting and capturing means of the PKC function hardware 20 monitors further keystroke commands from the matrix keys 14. If the ATM is not placed in key component entry mode, the method 30 comprises the further step 46 wherein the keystroke commands from the matrix keys 14 and the function commands from the function keys 16 pass through the PKC function hardware 20 directly to the ATM processor board 18.

When the ATM is placed in key component entry mode (i.e., a positive response at step 36), the method 30 comprises the further step 38 of entering a key component. The detecting and capturing means of the PKC function hardware 20 detects the keystroke commands from the matrix keys 14 and captures the key component entered into the ATM into temporary, non-persistent memory. The method 30 comprises the further step 40 of determining whether the PKC (i.e., the first key component) is present. The status of the discriminating means of the PKC function hardware 20 determines whether the PKC is present in the PKC storage 24. If not, the method 30 comprises the further step 42 of saving the key component entered into the ATM as the PKC. The key component is persistently stored in the PKC storage 24 of the PKC function hardware 20 and the status of the discriminating means is updated. Once the PKC is persistently stored in the non-volatile memory of the PKC storage 24, it can only be erased or replaced under program control of the PKC function hardware 20. Thereafter, the method comprises the further step 46 wherein the keystroke commands from the matrix keys 14 and the function commands from the function keys 16 pass through the PKC function hardware 20 directly to the ATM processor board 18. Meanwhile, the detecting and capturing means for the PKC function hardware 20 again monitors the state of the Supervisor/In Service switch 12 until the second key custodian enters the second key component into the ATM.

As previously mentioned, the PKC is preferably entered during initialization of the ATM at the ATM staging facility or during installation of the ATM at the field location. In this manner, the second key component can be entered by a second individual to securely establish the unique cryptographic key in the first cryptographic device in compliance with network operating rules and ANSI Standards while utilizing only a single key custodian in the field. If the PKC is already present in the PKC storage 24, the method 30 comprises the further step 44 of combining the key component entered into the ATM (i.e., the second key component) with the PKC to form the unique cryptographic key. Preferably, the step 44 comprises combining each byte of the second key component with the corresponding byte of the PKC utilizing an "exclusive or" operation. Once the unique cryptographic key is formed, the method 30 comprises the further step 46 wherein the keystroke commands from the matrix keys 14 and the function commands from the function keys 16 pass through the PKC function hardware 20 directly to the ATM processor board 18. In addition, the unique cryptographic key is passed to the ATM processor board 18 for use in conducting secure electronic communications with a second cryptographic device. Meanwhile, the detecting and capturing means of the PKC function hardware 20 again monitors the state of the Supervisor/In Service switch 12 until a second key custodian enters a different second key component into the ATM to form another unique cryptographic key.

It should be noted that the apparatus 10 and method 30 described and illustrated herein is not limited to the secure establishment of a single unique cryptographic key. In the event that the unique cryptographic key must be changed, for example if the ATM processor board is damaged, component failure occurs or it is necessary or desirable to upgrade the ATM processor board, the apparatus 10 and method 30 can be utilized to securely establish another unique cryptographic key in the first cryptographic device. Although the PKC (i.e., the first key component) remains the same, a different second key component can be combined with the PKC to form another unique cryptographic key. The process can be repeated as often as required to form as many new unique cryptographic keys in the first cryptographic device as desired. Each time, a unique cryptographic key is established in the ATM using the principles of dual control and split knowledge without the need for two key custodians to be present at the ATM simultaneously, as is currently required.

The preceding recitation is provided as an example of a preferred embodiment of an apparatus and method according to the invention and is not meant to limit the nature or scope of the invention as defined by the appended claims. The apparatus and method described herein is particularly well suited for securely establishing unique cryptographic keys in a first cryptographic device, and in particular, in an ATM of the type commonly provided by a bank or other financial institution. Nevertheless, the apparatus and method of the present invention is equally applicable for securely establishing a unique cryptographic key between any pair of cryptographic devices that are geographically widely scattered and require secure electronic communications, such as a plurality of ATMs and a host central computer. In addition, the PKC function hardware 20 described here also permits cryptographic devices that accept only a single key component to accept both a first key component (i.e., a PKC) and a second key component, thereby bringing such devices into compliance with network operating rules and voluntary ANSI Standards, for example ANSI X9.24—Retail Key Management. First cryptographic devices that utilize a keyboard and computer display, for example Diebold models 106x or 107x ATMs, can implement the advantages of the PKC function hardware 20 by adding a persistent memory element and implementing the method 30 via programming.

That which is claimed is:

1. An apparatus for securely establishing a unique cryptographic key in a first cryptographic device, the first cryptographic device having means for entering a key component and a processor for processing electrical signals, said apparatus electrically disposed between the key component entry means and the processor of the first cryptographic device and comprising:
   a microprocessor in electrical communication with the key component entry means and the processor of the first cryptographic device;
   means for persistently storing a first key component entered from the key component entry means by a first key custodian, said persistent storage means in electrical communication with said microprocessor; and
   means for temporarily storing a second key component entered, at a subsequent time, from the key component entry means by a second key custodian;
   wherein said microprocessor comprises means for combining the first key component stored in said persistent storage means with the second key component to form the unique cryptographic key.

2. An apparatus according to claim 1 wherein said microprocessor further comprises:

means for detecting and capturing the entry of the first key component and the second key component from the key component entry means of the first cryptographic device;
   means for discriminating between the first key component and the second key component entered from the key component entry means of the first cryptographic device;
   means for combining the first key component stored in said persistent storage means with the second key component to form the unique cryptographic key; and
   means for passing the unique cryptographic key to the processor of the first cryptographic device.

3. An apparatus according to claim 1 wherein said persistent storage means comprises a non-volatile memory device.

4. An apparatus according to claim 3 wherein said non-volatile memory device is a battery-backed Random Access Memory (RAM).

5. An apparatus according to claim 3 wherein said non-volatile memory device is an Electrically Erasable Programmable Read Only Memory (EEPROM).

6. An apparatus according to claim 2 wherein said detecting and capturing ms electrically monitors the key component entry mean of the first cryptographic device for a predetermined electrical signal from the key component entry means and temporarily stores the second key component entered from the key component entry means in a non-persistent memory device once the electrical signal is received from the key component entry means.

7. An apparatus according to claim 2 wherein said combining means electrically combines each byte of the second key component with the corresponding byte of the first key component using an "exclusive or" operation to form the unique cryptographic key.

8. An apparatus for securely establishing a unique cryptographic key, said apparatus comprising:
   a first cryptographic device comprising:
      means for entering a key component; and
      a processor electrically coupled to said key component entry means for receiving electrical signals therefrom; and
      persistent key component function hardware electrically disposed between said key component entry means and said processor, said persistent key component function hardware comprising:
         a microprocessor in electrical communication with said key component entry means and said processor of said first cryptographic device;
         means for persistently storing a first key component entered from the key component entry means by a first key custodian, said persistent storage means in electrical communication with said microprocessor; and
         means for temporarily storing a second key component entered at a subsequent time, from the key component entry means by a second key custodian;
         wherein said microprocessor of said persistent key component function hardware comprises means for combining the first key component stored in said persistent storage means with the second key component to form the unique cryptographic key.

9. An apparatus according to claim 8 wherein said microprocessor of said persistent key component function hardware further comprises:
   means for detecting and capturing the entry of the first key component and the second key component from said key component entry means of said first cryptographic device;

means for discriminating between the first key component and the second key component entered from said key component entry means of said first cryptographic device;

means for combining the first key component stored in said persistent storage means of said persistent key component function hardware with the second key component to form the unique cryptographic key; and means for passing the unique cryptographic key to said processor of said first cryptographic device.

10. An apparatus according to claim 8 wherein said persistent storage means of said persistent key component function hardware comprises a non-volatile memory device.

11. An apparatus according to claim 10 wherein said non-volatile memory device is a battery-backed Random Access Memory (RAM).

12. An apparatus according to claim 10 wherein said non-volatile memory device is an Electrically Erasable Programmable Read Only Memory (EEPROM).

13. An apparatus according to claim 9 wherein said detecting and capturing means electrically monitors said key component entry means of said first cryptographic device for a predetermined electrical signal from said key component entry means and temporarily stores the second key component entered from said key component entry means in a non-persistent memory device once the electrical signal is received from said key component entry means.

14. An apparatus according to claim 9 wherein said combining means electrically combines each byte of the second key component with the corresponding byte of the first key component using an "exclusive or" operation to form the unique cryptographic key.

15. An apparatus according to claim 8 wherein said first cryptographic device further comprises:

a switch electrically coupled to said persistent key component function hardware for selectively activating and deactivating said microprocessor; and input means electrically coupled to said persistent key component function hardware for inputting a key component to said microprocessor;

wherein said input means inputs the first key component to said microprocessor and said persistent storage means persistently stores the first key component at a convenient location and time; and wherein said input means subsequently inputs the second key component to said microprocessor and said microprocessor combines the second key component with the first key component, thereby requiring only a single key custodian to be present at a current location of the first cryptographic device even though establishing the unique cryptographic key in said first cryptographic device using split knowledge and dual control.

16. A method of securely establishing a unique cryptographic key in a first cryptographic device, said method comprising the steps of:

placing the first cryptographic device in an operational state to establish the unique cryptographic key;

entering a first key component into the first cryptographic device, by a first key custodian, at a convenient location and time;

storing the first key component in a persistent, non-volatile memory device as a persistent key component;

entering a second key component into the first cryptographic device, by a second key custodian, at a subsequent time;

storing the second key component in a temporary, non-persistent memory device; and combining the second key component with the persistent key component to form the unique key component.

17. A method of securely establishing a unique cryptographic key according to claim 16 wherein the step of entering a first key component comprises the further steps of:

detecting entry of the first key component; and if a persistent key component is already present in the persistent, non-volatile memory device, skipping operation of the steps of storing the first key component, entering a second key component, and storing the second key component, and instead storing the first key component in the temporary, non-persistent memory device as the second key component.

18. A method of securely establishing a unique cryptographic key according to claim 16 wherein the step of combining comprises the further step of combining each byte of the second key component with the corresponding byte of the persistent key component using an "exclusive or" operation.

* * * * *

UNITED STATES PATENT AND TRADEMARK OFFICE
CERTIFICATE OF CORRECTION

PATENT NO.    : 6,684,334 B1
DATED         : January 27, 2004
INVENTOR(S)   : Abraham Page 1 of 1

It is certified that error appears in the above-identified patent and that said Letters Patent is hereby corrected as shown below:

Column 2,
Line 65, change "objectives" to read -- objectives --.

Column 4,
Line 38, change "fist" to read -- first --.

Column 6,
Line 54, change "flyer" to read -- further --.

Column 7,
Line 42, change "in Service" to read -- In Service --.

Column 8,
Line 67, change "is" to read -- are --.

Column 10,
Line 23, change "ms" to read -- means --;
Line 53, change "entered" to read -- entered, --.

Signed and Sealed this

Twenty-fourth Day of August, 2004

JON W. DUDAS
*Director of the United States Patent and Trademark Office*